United States Patent [19]

Besenfelder

[11] 3,810,233

[45] May 7, 1974

[54] APPARATUS TO DETECT PHASE ENCODED DATA BEING READ FROM A DATA STORAGE SUBSYSTEM

[75] Inventor: Edward R. Besenfelder, Phoenix, Ariz.

[73] Assignee: Honeywell Information Systems Inc., Waltham, Mass.

[22] Filed: Mar. 9, 1973

[21] Appl. No.: 339,813

[52] U.S. Cl. ....................................... 360/42

[51] Int. Cl. ....................................... G11b 5/02

[58] Field of Search 340/174.1 A, 174.1 B, 174.1 G, 340/174.1 H

[56] References Cited

UNITED STATES PATENTS

| | | | |
|---|---|---|---|
| 3,597,752 | 8/1971 | Eldort | 340/174.1 H |
| 3,736,581 | 5/1973 | Breikss | 340/174.1 H |
| 3,737,632 | 6/1973 | Barnes | 340/174.1 H |
| 3,688,211 | 8/1972 | Calaway | 340/174.1 H |

*Primary Examiner*—Vincent P. Canney

[57] ABSTRACT

The presence of phase encoded data being read from a magnetic medium is detected by an envelope detector employing logic gates, flip-flops and a pair of up/-down counters. The detector provides an output signal when the preamble portion of the data envelope has been received from the magnetic medium. The detector continues to provide an output signal for a predetermined time after the end of the data.

4 Claims, 2 Drawing Figures

APPARATUS TO DETECT PHASE ENCODED DATA BEING READ FROM A DATA STORAGE SUBSYSTEM

BACKGROUND OF THE INVENTION

This invention relates to magnetic recording systems and more particularly to apparatus for detecting phase encoded data being read from a data storage subsystem.

In modern data processing systems data is stored on magnetic tape or magnetic disks for retrieval and use at a later time. It is important that large quantities of data be stored as compactly as possible to minimize the number of reels of tape or number of disks used with the data processing systems. One of the techniques used to increase the quantity of data which can be stored in a given space is to use phase encoding. It phase encoding data bits are represented by a change in the voltage level. For example, a binary zero may be represented by an increasing signal voltage and a binary one may be represented by a decreasing signal voltage. When a series of binary ones or a series of binary zeros are recorded it is necessary to include a "phase bit" between the binary ones or between the binary zeros. The phase bit may be used to synchronize the data with the oscillator. This synchronization causes the data processing system to read the data at the time the signal voltage level changes so that noise voltages which occur at other times will not introduce errors into the data processing system.

The data is stored in "blocks" with each block of data having a preamble, followed by the data and by the postamble or the end of the block. The preamble is used to synchronize an oscillator in the magnetic tape subsection. The oscillator is then used to enable the subsection to sample or "read" each of the data pulses near the middle of the pulse so that noise and other interference will not introduce error signals into the data processing system. In the magnetic tape subsystem a series of 40 pulses comprise the preamble which immediately precedes the data recorded on each block of tape. These forty pulses of the preamble are used to synchronize the oscillator so that it will be in exact synchronization with the data pulses being read. An envelope detector may be used to sense that the preamble has been completed and that the data is now ready to be read or transferred from the magnetic tape subsection to the central processor of the data processing system. Prior art envelope detectors use a large plurality of flip-flops, AND-gates, and inverters to detect the start of the data portion of the envelope. Such prior art envelope detectors are expensive to construct and are bulky so that they require appreciable amounts of storage space in the data storage systems. What is needed is a compact and inexpensive envelope detector. The disadvantages of the prior art are alleviated by the present invention which uses four flip-flops, some logic gates and a pair of up/down counters to provide a compact and less expensive envelope detector.

It is, therefore, an object of this invention to provide a new and improved envelope detector.

Another object of this invention is to provide apparatus for detecting the preamble of a block of data.

A further object of this invention is to provide apparatus which develops a signal when a complete preamble has been received.

A still further object of this invention is to provide apparatus which develops a signal when data is being received.

SUMMARY OF THE INVENTION

The foregoing objects are achieved in the instant invention by providing an envelope detector which employs logic gates, flip-flops and a pair of up/down counters to detect the preamble of the block of data.

Other objects and advantages of this invention will become apparent from the following description when taken in connection with the accompanying drawings.

DESCRIPTION OF THE PREFERRED EMBODIMENT

Figure 1:
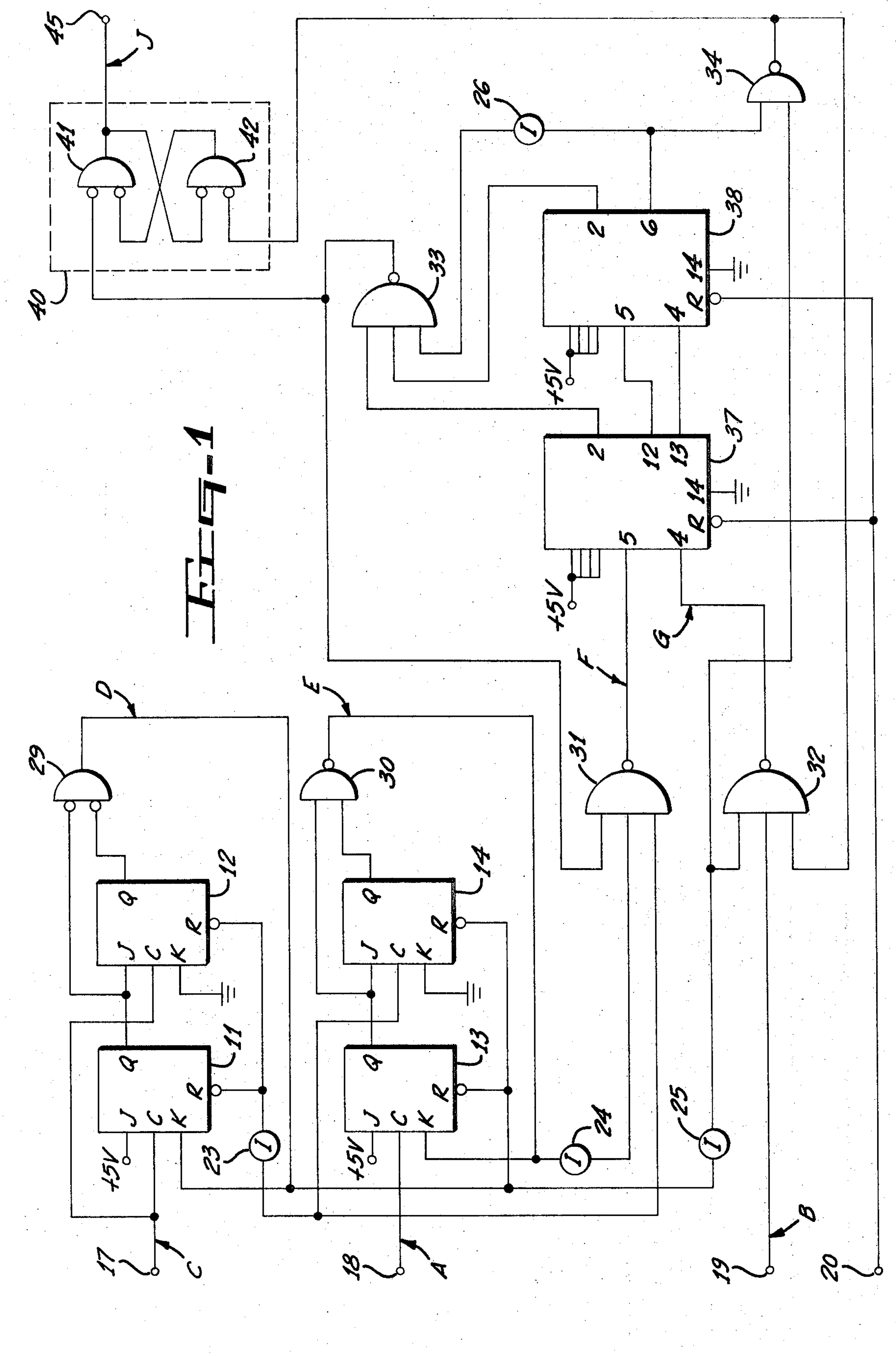
FIG. 1 is a circuit diagram of one embodiment of the instant invention.

The envelope detector shown in FIG. 1 includes a plurality of JK flip-flops 11–14, a plurality of inverters 23–26, a plurality of gates and a pair of up/down counters 37 and 38. The JK flip-flops are circuits adapted to operate in either one of two stable states and to transfer from the state in which they are operating to the other stable state upon the application of a trigger signal thereto. In one state of operation the JK flip-flop represents a binary one (1-state) and in the other state it represents a binary zero (0-state). The three leads entering the left-hand side of the flip-flop symbol, for example, flip-flop 11 provide the required trigger signals. The upper lead, the J lead provides the set signal, the lower lead, the K lead, provides the reset signal and the center lead provides the triggering signal. When the set input signal on the J lead, is positive and the reset signal, on the K lead has a low value a positive trigger signal on the C lead causes the flip-flop to change to the one state, if it is not already in the 1-state. When the reset signal is positive and the set signal zero, a positive trigger signal causes the flip-flop to transfer to the 0-state if it is not already in the zero state. The R lead entering the bottom of the flip-flop provides reset signals. When a zero voltage potential is applied to the R lead, the flip-flop resets to the 0-state and remains in the 0-state as long as the zero voltage potential remains on the R lead irrespective of the signals on the J, C and K leads. The Q output lead leaving the right hand side of the flip-flop delivers a one output signal of the flip-flop.

Counters 37 and 38 are synchronous 4-bit up/down counters such as the Ser. No. 74,193 which is available from several manufacturers. Details of the operation of this counter may be found in "The Integrated Circuit Catalog for Design Engineers," first edition, by Texas Instruments, Dallas, Tex. The Ser. No. 74,193 counts up when pulses are applied to input lead No. 5 while a positive voltage is applied to input lead No. 4 The Ser. No. 74,193 counts down when pulses are applied to input lead No. 4 while a positive voltage is applied to input lead No. 5. Leads No. 2 and 6 of the Ser. No. 74,193 are counter output leads, while lead 12 is a carry lead and lead 13 is a borrow lead.

The NAND-gates 30–34 disclosed in FIG. 1 provide a logical NAND function for input logic signals applied to its input leads. In the system disclosed, a binary one is represented by a positive signal, the NAND-gate provides an output signal of approximately zero volts representing a binary zero, when and only when all of the input signals applied to its input leads are positive and represent binary ones. Conversely, the NAND-gate provides a positive output signal representing a binary one when any one or more of the input signals applied thereto represent binary zeros.

The inverters 23–26 each provide the logical operation of inversion for an input signal applied thereto. The inverter provides a positive output signal representing a binary one when the input signal applied thereto has a low value representing a binary zero. Conversely, the inverter provides an output signal representing a binary zero when the input signal represents a binary one. The NOR-gates 29, 41 and 42 each provide an output signal representing a binary one when both of the input signals represent binary zeros. When either of the input signals applied thereto represents a binary one the output signal represents a binary zero.

Figure 2:
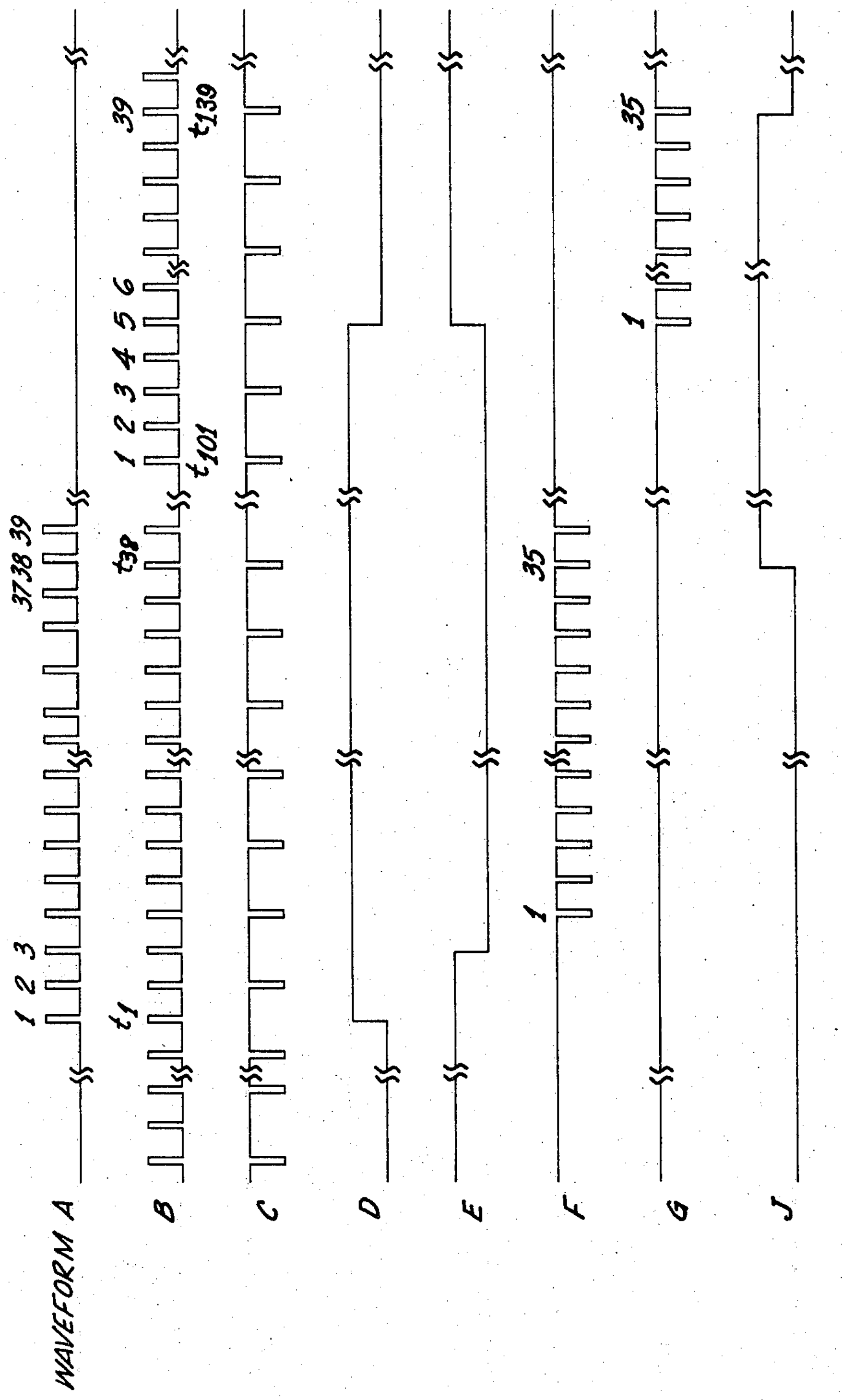
FIG. 2 illustrates waveforms which are useful in explaining the operation of the invention shown in FIG. 1.

The operation of the envelope detector shown in FIG. 1 will now be described in connection with the voltage waveforms shown in FIG. 2. The data pulses of waveform A of FIG. 2 are applied to signal input terminal 18 of the envelope detector of FIG. 1 and the timing or clock pulses of waveform B are applied to signal input terminal 19. The frequency of the timing pulses of waveform B are divided by two as shown in waveform C and are applied to signal input terminal 17 of FIG. 1. A reset signal may be applied to signal input terminal 20 of fig. 1 to preset the up/down counters 37 and 38 so that the voltages from the output leads of both counter 37 and 38 are high prior to the receipt of any data pulses on the input terminal 18 of FIG. 1.

Waveform A of FIG. 2 represents the data input signals which include a preamble comprising a plurality of positive pulses which may be followed by data and then by a postamble. A portion of the preamble is shown in the waveform A; however, the data portion of the waveform is not shown. Waveform B illustrates timing pulses from the oscillator which is applied to input terminal 19. The same oscillator signal is divided by two and applied to signal input terminal 17 as waveform C.

The leading edge of the first pulse of waveform A at input terminal 18 is inverted by inverter 23 and applied to the reset lead of flip-flops 11 and 12 a time $t_1$. This first pulse resets flip-flops 11 and 12 so that the voltage on the Q output leads of flip-flops 11 and 12 is low thereby causing NOR-gate 29 to provide a positive value of output voltage. This positive value of output voltage from gate 29 removes the negative reset voltage from flip-flops 13 and 14 so that the trailing edge of the first pulse of waveform A causes flip-flop 13 to be set. When flip-flop 13 is set the positive voltage from the Q output lead of flip-flop 13 is applied to the J input lead of flip-flop 14 and to the upper input lead of NAND-gate 30. The positive voltage on the J input lead of flip-flop 14 causes the next pulse from terminal 18 to set flip-flop 14. Since the K input lead of flip-flop 14 is grounded the flip-flop 14 cannot be reset and is latched in a set condition. This second pulse also causes flip-flop 13 to be reset. The third pulse at input terminal 18 causes flip-flop 13 to be set so that a positive voltage from the Q output lead is applied to the upper lead of the NAND-gate 30. At this time flip-flops 13 and 14 are both set so that positive voltages are applied to both of the input leads of NAND-gate 30 causing NAND-gate 30 to provide a low value of voltage on the output lead. This low value of voltage is applied to the K input lead of flip-flop 3 so that flip-flop 13 cannot be reset and is latched in a set condition. The low output voltage of NAND-gate 30 is inverted by inverters 24 and applied to the center lead of NAND-gate 31. At this same time the NAND-gate 33 provides a positive voltage to the upper input lead of gate 31 thereby enabling gate 31.

At the same time the high output voltage from NAND-gate 29 is inverted by inverter 25 and applied to the upper lead of NAND-gate 32 thereby causing NAND-gate 32 to provide a positive voltage on input lead 4 of the up/down counter 37. The fourth positive pulse from input terminal 18 and subsequent pulses are gated through gate 31 which has been enabled and are applied to the input lead 5 of counter 37 causing counter 37 to count upward. Each of the subsequent positive pulses from input temrinal 18 causes counter 37 and 38 to count toward a value of 40. When 38 positive pulses have been received at signal input terminal 18 the voltage from the output lead No. 2 of counter 37 is positive, the output voltage from lead No. 2 of counter 38 is positive and the output voltage from lead 6 of counter 38 has a low value. This low value of voltage on output lead 6 of counter 38 is inverted by inverter 26 and applied to NAND-gate 33. All of the input voltages to gate 33 are positive causing gate 33 to provide a negative voltage to the upper input lead of NAND-gate 41. Gate 41 provides a positive voltage to output terminal 45 at time t38 as shown in waveform J. At the same time the low voltage from output lead 6 of counter 38 causes NAND-gate 34 to provide a positive voltage to the lower lead of NOR-gate 42 thereby causing gate 42 to provide a low value of voltage to the lower lead of gate 41. The low value of voltage at the output lead of NAND-gate 33 provides a low value of voltage to gate 31 thereby disabling gate 31 and preventing any further upward counting by counters 37 and 38. The low value of voltage from the output lead of gate 42 and the low value of voltage from gate 33 cause gate 41 to provide a positive output so that the latching circuit 40 is latched until the counters 37 and 38 count down. As long as data pulses continue to be received on the input terminal 18 the counter will not count down and the output voltage on terminal 45 remains positive. During this time the data pulses from input terminal 18 keep the flip-flops 11 and 12 reset so that the timing pulses on input terminal 17 do not effect the setting of flip-flops 11 and 12.

When pulses are no longer received on input terminal 18 the pulses on input terminal 17 cause flip-flops 11 and 12 to start the downward count. The first pulse at input terminal 17 causes flip-flop 11 to be wet and to provide a positive voltage to the J input lead of flip-flop 12. The positive voltage on the J input lead of flip-flop 12 and the second pulse on the e input lead cause flip-flop 12 to be set and to provide a positive voltage to the lower lead of gate 29. Since the K input lead of flip-flop 12 is grounded flip-flop 12 cannot be reset and is latched in a set condition. The second pulse also resets flip-flop 11. The third pulse on terminal 17 causes flip-flop 11 to be set so that a positive voltage form the Q output lead is applied to the upper lead of NOR-gate 29. At this time flip-flops 11 and 12 are both set so that positive voltages are applied to both of the inputs leads of NOR-gate 29 causing gate 29 to provide a low value of voltage to inverter 25. The low value of voltage to inverter 25 causes inverter 25 to provide a positive voltage to the upper input lead of NAND-gate 32. The positive voltage from the output lead of NAND-gate 34 is applied to the lower input lead of NAND-gate 32 so that gate 32 is enabled and clock pulses on input terminal 19 are gated through gate 32 to the input lead number 4 of the counter 37. The pulses on the input lead number 4 of counter 37 and the positive voltage on the input lead number 5 of counter 37 cause counter 37 to start counting in a downward direction. At the end of 35 pulses on input lead 4 the output signals from counters 37 and 38 are positive so that the voltage to the input leads of NOR-gate 41 are positive causing the latching circuit 40 to be reset and the output voltage on output terminal 45 to be low as shown at time *t*139 of waveform J.

When a data envelope uses a smaller number of pulses in the preamble up/down counter 38 may be omitted from the circuit of FIG. 1 and the input leads of NAND-gates 33 and 34 may be connected to the output leads of counter 37.

While the principles of the invention have now been made clear in an illustrative embodiment, there will be many obvious modifications of the structure, proportions, materials and components without departing from those principles. The appended claims are intended to cover any such modifications.

I claim:

1. Apparatus for detecting a data envelope having a predetermined number of preamble pulses followed by a plurality of data pulses, for use with a source of pulses and a source of timing signals, said apparatus including:

first and second up/down counters each having first and second input leads and first, second and third output leads, said first input of said second counter being connected to said second output lead of said first counter, said second input lead of said second counter being connected to said third output lead of said first counter;

first means for developing a voltage from pulses, said first means for developing being connected to said source of pulses, said first means for developing being coupled to said second input lead of said first counter;

second means for developing a voltage from signals, said second means for developing being connected to said source of timing signals, said second means for developing being coupled to said first input lead of said first counter;

first and second gating means, said first gating means being connected between said source of pulses and said first input lead of said counter, said second gating means being connected between said source of signals and said second input lead of said first counter; and a logic gate having an output lead and first, second and third input leads, said first output lead of said first counter being connected to a first input lead of said logic gate, said first and said second output leads of said second counter each being connected to a corresponding one of said input leads of said logic gate.

2. Apparatus for detecting a data envelope as defined in claim 1 including:

a latching circuit having first and second input leads and an output lead, said first input lead of said latching circuit bieng connected to said output lead of said logic gate, said second input lead of said latching circuit being coupled to said second output lead of said second counter.

3. Apparatus for detecting a data envelope having a predetermined number of preamble pulses followed by a plurality of data pulses, for use with a source of pulses and a source of timng signals, said apparatus comprising:

first and second up/down counters each having first and second input leads and first, second and third output leads, said first input lead of said second counter being connected to said second output lead of said first counter, said second input lead of said second counter being connected to said third output lead of said first counter;

first, second, third and fourth flip-flops each having an output lead, a reset lead and first, second and third input leads, said second input leads of said first and said second flip-flops being coupled to said source of signals, said second input leads of said third and said fourth flip-flops being coupled to said source of pulses, said source of pulses being coupled to said reset leads of said first and said second flip-flops, said output lead of said first flip-flop being connected to said first input lead of said second flip-flop, said output lead of said third flip-flop being connected to said first input lead of said fourth flip-flop;

first and second reference potentials, said first potential being connected to said first input leads of said first and said third flip-flops, said second potential being connected to said third input leads of said second and said fourth flip-flops;

first, second and third logic gates each having first, second and third input leads and an output lead, said output lead of said second gate being connected to said first input lead of said first counter, said output lead of said third gate being connected to said second input lead of said first counter, said second input lead of said third logic gate being connected to said source of signals, said first input lead of said second logic gate being connected to said output lead of said first logic gate, said first output lead of said first counter being connected to said first input lead of said first logic gate, said first output lead of said second counter being connected to said second input lead of said first logic gate, said second output lead of said second counter being coupled to said third input lead of said first logic gate; and first and second gating means each having first and second input leads and an output lead, said output lead of said first gating means being coupled to said third input lead of said first flip-flop and to said first input lead of said third logic gate, said first input lead of said first gating means being connected to said output lead of said first flip-flop, said second input lead of said first gating means being connected to said output lead of said second flip-flop, said output lead of said first gating means being connected to said output lead of said second flip-flop, said output lead of said first gating means being connected to said reset leads of said third and said fourth flip-flops, said first input lead of said second gating means being connected to said output lead of said third flip-flop, said second input lead of said second gating means being connected to said output lead of said fourth flip-flop, said output lead of said second gating means being coupled to said third input lead of said third of said flip-flop and to said second input lead of said second logic gate.

4. Apparatus for detecting a data envelope as defined in claim 3 including:

a latching circuit for first and second input leads and an output lead, said first input lead of said latching circuit being connected to said output lead of said first logic gate, said second input lead of said latching circuit being coupled to said third input lead of said first logic gate.

* * * * *

UNITED STATES PATENT OFFICE

CERTIFICATE OF CORRECTION

PATENT NO. : 3,810,233

DATED : May 7, 1974

INVENTOR(S) : Edward R. Besenfelder

It is certified that error appears in the above-identified patent and that said Letters Patent are hereby corrected as shown below:

IN THE DRAWINGS

In FIGURE 1, a connection should exist between the horizontal line denoted as "A" and the leftmost vertical line crossing thereover.

Signed and Sealed this

Thirteenth Day of July 1976

[SEAL]

*Attest:*

RUTH C. MASON
*Attesting Officer*

C. MARSHALL DANN
*Commissioner of Patents and Trademarks*